US010097865B2

(12) United States Patent
Li et al.

(10) Patent No.: US 10,097,865 B2
(45) Date of Patent: Oct. 9, 2018

(54) GENERATING SYNTHETIC FRAME FEATURES FOR SENTINEL FRAME MATCHING

(71) Applicant: ARRIS Enterprises LLC, Suwanee, GA (US)

(72) Inventors: Renxiang Li, Lake Zurich, IL (US); Stephen P. Emeott, Rolling Meadows, IL (US); Faisal Ishtiaq, Chicago, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/153,370

(22) Filed: May 12, 2016

(65) Prior Publication Data

US 2017/0332112 A1 Nov. 16, 2017

(51) Int. Cl.
*H04H 60/32* (2008.01)
*H04N 5/445* (2011.01)
(Continued)

(52) U.S. Cl.
CPC ... *H04N 21/23424* (2013.01); *G06K 9/00758* (2013.01); *H04N 21/232* (2013.01);
(Continued)

(58) Field of Classification Search
CPC .................. H04N 21/8455; H04N 21/232
(Continued)

(56) References Cited

U.S. PATENT DOCUMENTS 6,100,941 A 8/2000 Dimitrova et al.
7,164,798 B2 1/2007 Hua et al.
(Continued)

FOREIGN PATENT DOCUMENTS

WO 2009/106998 A1 9/2009

OTHER PUBLICATIONS

U.S. Appl. No. 15/153,236, filed May 12, 2016. Stephen Emeott et al., "Detecting Sentinel Frames in Video Delivery Using a Pattern Analysis", (Pending publication, filed on even date with present application.).
PCT Search Report & Written Opinion, Re: Application No. PCT/US2017/032125, dated Aug. 1, 2017.

*Primary Examiner* — Pankaj Kumar
*Assistant Examiner* — Franklin S Andramuno
(74) *Attorney, Agent, or Firm* — Stewart M. Wiener

(57) ABSTRACT

Particular embodiments can refine a seed sentinel frame signature for a seed sentinel frame. The seed sentinel frame may be predictable or partially predictable content that demarks a beginning and/or end of certain content in a video program. The seed sentinel frame may be first used to detect other sentinel frames in the video program. However, other sentinel frames throughout the video program, or in other video programs, may be slightly different from the given sentinel frame due to different reasons. The seed sentinel frame signature may not detect the sentinel frames of a video program with a desired accuracy. Accordingly, particular embodiments may refine the sentinel frame signature to a synthetic sentinel frame signature. The synthetic sentinel frame signature may then be used to analyze the current video program or other video programs. The synthetic sentinel frame signature may more accurately detect the sentinel frames within the video program.

18 Claims, 10 Drawing Sheets

(51) Int. Cl.
  *H04N 21/234*      (2011.01)
  *H04N 21/24*       (2011.01)
  *H04N 21/232*      (2011.01)
  *H04N 21/845*      (2011.01)
  *G06K 9/00*        (2006.01)
  *H04N 21/81*       (2011.01)

(52) U.S. Cl.
  CPC ....... *H04N 21/23418* (2013.01); *H04N 21/24* (2013.01); *H04N 21/812* (2013.01); *H04N 21/8455* (2013.01)

(58) Field of Classification Search
  USPC .................................................... 725/17, 46
  See application file for complete search history.

(56) References Cited

U.S. PATENT DOCUMENTS

| | | |
|---|---|---|
| 7,684,616 B2 | 3/2010 | Cieplinski |
| 7,761,491 B2 | 7/2010 | Glasberg et al. |
| 8,654,255 B2 | 2/2014 | Hua et al. |
| 2004/0045020 A1* | 3/2004 | Witt ....................... H04N 7/163 |
| | | 725/13 |
| 2004/0170321 A1 | 9/2004 | Gong et al. |
| 2004/0194130 A1 | 9/2004 | Konig et al. |
| 2010/0092077 A1 | 4/2010 | Peters et al. |
| 2010/0322592 A1* | 12/2010 | Casagrande ........... H04N 5/147 |
| | | 386/241 |
| 2012/0263388 A1 | 10/2012 | Vaddadi et al. |
| 2014/0037216 A1 | 2/2014 | Kumar et al. |
| 2016/0353139 A1* | 12/2016 | Smith .............. H04N 21/23424 |
| 2017/0024158 A1* | 1/2017 | Brkic .................... G09G 5/393 |

* cited by examiner

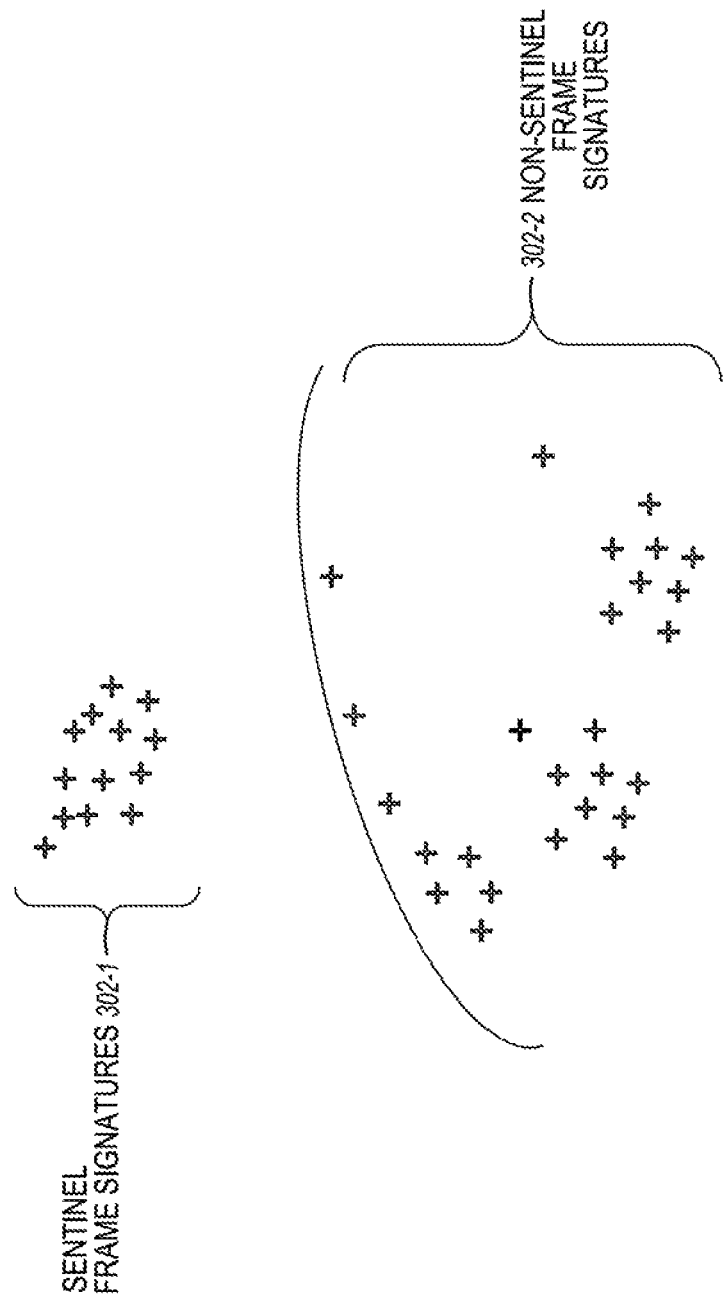

US 10,097,865 B2

GENERATING SYNTHETIC FRAME FEATURES FOR SENTINEL FRAME MATCHING

BACKGROUND

Video content providers generate video content that may include video sequences, such as commercials. A service provider may broadcast the video content in different locations, such as different countries, different parts of a country, etc. For example, the video content may be first played in a first country with advertisements that are relevant to that country or locality. Then, the video content may be played in a different country or locality. In some cases, due to the different locality, the advertisements inserted into the original video content may not be relevant to the new locality. For example, advertisements in a language foreign to the new locality are not relevant to the new locality. The service provider may want to replace the advertisements in the video content. However, the video service provider needs to detect where the advertisements are located in the video content.

BRIEF DESCRIPTION OF THE DRAWINGS

FIG. 3 depicts an example of a distribution of frame signatures according to one embodiment.

DETAILED DESCRIPTION

Described herein are techniques for refining a sentinel frame signature. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Overview

Particular embodiments can refine a seed sentinel frame signature for a seed sentinel frame. The seed sentinel frame may be predictable or partially predictable content that demarks a beginning and/or end of certain content in a video program, such as advertisements or other scenes. The seed sentinel frame may be first used to detect other sentinel frames in the video program. However, other sentinel frames throughout the video program, or in other video programs, may be slightly different from the given sentinel frame due to different reasons. Thus, the seed sentinel frame signature may not detect the sentinel frames of a video program with a desired accuracy. Accordingly, particular embodiments may refine the sentinel frame signature to a synthetic sentinel frame signature. The synthetic sentinel frame signature may then be used to analyze the current video program or other video programs. The synthetic sentinel frame signature may more accurately detect the sentinel frames within the video program.

Figure 1:
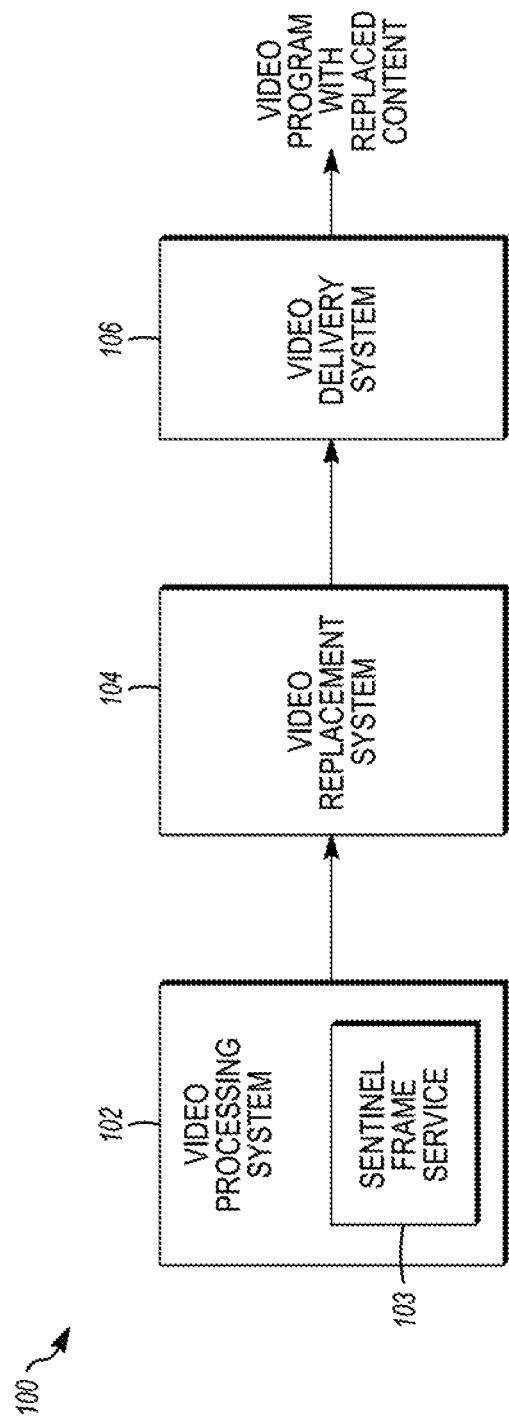
FIG. 1 depicts a simplified system for refining a sentinel frame signature according to one embodiment.

FIG. 1 depicts a simplified system 100 for refining a sentinel frame signature according to one embodiment. System 100 includes a video processing system 102, a video replacement system 104, and a video delivery system 106.

Video processing system 102 can select sentinel frames found in a video program. The sentinel frames may be one or more frames that indicate a boundary from a first type of video content, such as program content, to a second type of video content, such as an advertisement, from another type of video content, such as program content (e.g., a show or movie). The boundary is used such that the second type of content can be identified and a service can be performed for the second type of content. As will be described in more detail below, video processing system 102 includes a sentinel frame service 103 that may refine a seed sentinel frame signature to generate a synthetic sentinel frame signature. Sentinel frame service 103 may use a refined sentinel matching service that refines a seed sentinel frame signature to a synthetic sentinel frame signature. The synthetic sentinel frame signature can then be used to detect sentinel frames with possibly more accuracy than the original seed sentinel frame signature.

The seed sentinel frame may be the original or initial sentinel frame that is used to determine sentinel frames in the video program. The seed sentinel frame may be provided by a video content provider or another source. Also, a video service provider, such as the company that is delivering the video program to customers, may generate the seed sentinel frame, such as via frame capture techniques. Alternatively, the seed sentinel frame may be sampled from a video program. As discussed above, a sentinel frame may be predictable or partially predictable content. For example, before advertisements are played, the video program will most likely display the sentinel frame. It should be noted that although the sentinel frame is discussed, the sentinel frame may include a series of frames.

A signature is used to describe a set of visual descriptors for a frame. The term signature will be used for discussion purposes, but could be replaced with features. The frame features may be visual descriptor data for each frame, such as information that can be determined from decoding the video. In one embodiment, each frame may include color layout (CLD), edge histogram (EHD), or other histogram features. In another embodiment, each frame may include local features that are invariant under certain transformations. These features include values that describe the characteristics for the frame. Other features that can be determined from encoding/decoding the video program may also be used.

Video processing system 102 may provide the sentinel frames to a video replacement system 104. For example, video processing system 102 sends the frame identifiers for sentinel frames. Video replacement system 104 may then perform services on the video program using the frame identifiers. For example, video replacement system 104 may use the sentinel frames as boundaries to select video segments, such as the advertisements, from the video program. Then, video replacement system 104 may perform a service, such as replacing the video segments with different video content. For example, video replacement system 104 may replace advertisements from one locality for advertisements that are more pertinent to a second locality. In another example, video replacement system 104 may serve the identified video segments as a new form of video program, such as highlights for a sporting event may be identified. Although video replacement is described, other services may be performed, such as translation and video editing.

A video delivery system 106 may then be used to deliver the video program with the replaced video content. In one embodiment, video delivery system 106 may have the video content replaced in substantially real time. For example, the sentinel frames may be detected and video content replaced by video replacement system 104 with only a one or two second delay in delivering video content from a broadcast (e.g., a live or scheduled broadcast). In other embodiments, video delivery system 106 may have the video replaced in the video content in the background or before the initiation of delivery of the video program.

Sentinel Frame Service

Figure 2:
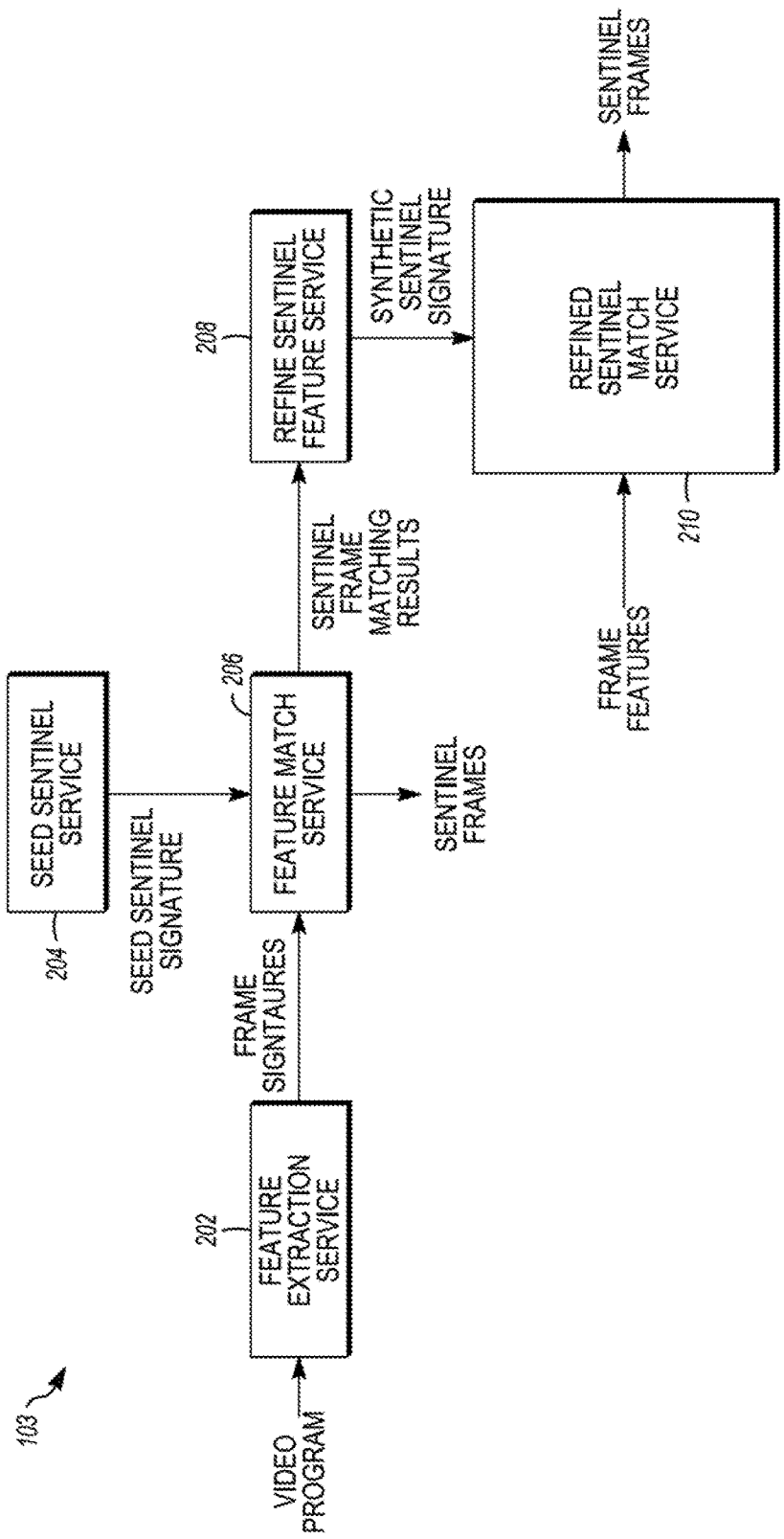
FIG. 2 depicts a more detailed example of the sentinel frame service according to one embodiment.

FIG. 2 depicts a more detailed example of sentinel frame service 103 according to one embodiment. Sentinel frame service 103 may receive a video program. The video program may be received in substantially real time as the video program is being broadcast by video delivery system 106 or may be received in the background when the video program is not being currently broadcast. In one embodiment, the broadcast to customers may be delayed by a certain time period, such as a couple seconds, to allow for video replacement to be performed. In this case, sentinel frame service 103 will detect the sentinel frames and provide them to video replacement system 104 during the broadcast.

A feature extraction service 202 receives the video program and can extract features for portions of the video. For example, the portions may be frames or pictures. A frame may be a complete image captured during a known time interval. In other embodiments, the frame may be a partial image. Although frames are described, it will be understood that other terms may be used, such as a picture. Feature extraction service 202 determines frame features for each frame and those frame features form a frame signature. Feature extraction service 202 then outputs the frame signatures for the frames of the video program.

A seed sentinel service 204 may receive the seed sentinel frame from an outside source, such as the video content provider or a video analysis service. In other embodiments, seed sentinel service 204 may analyze the video program to determine a seed sentinel frame. A seed sentinel frame may be a frame or frames that are an initial frame that could be used as a boundary to mark the advertisements.

To represent the seed sentinel frame, seed sentinel service 204 may extract the sentinel frame features from the sentinel frame using the same process as feature extraction service 202 used to extract the frame features from the video program frames. Seed sentinel service 204 outputs a seed sentinel frame signature that includes the seed sentinel features.

A feature match service 206 receives the frame signatures and the seed sentinel frame signature. Feature match service 206 then performs sentinel frame signature matching between the frame signatures and the seed sentinel frame signatures. In one embodiment, feature match service 206 may generate a distance between the sentinel frame signature and each frame signature in the video program. This may result in a one-dimensional matching distance curve indicating how close each frame is to the sentinel frame in the feature space. Although this matching is described, it will be understood that other matching processes may also be performed.

Feature match service 206 can then output the sentinel frames. These may be identifiers, indices, or time stamps indicating when sentinel frames occur in the video program. These sentinel frames may be used by video replacement system 104 if a second analysis using the synthetic sentinel frame will not be used. Also, feature match service 206 may output sentinel frame matching results, which may be used to generate a synthetic sentinel frame. In this case, the sentinel frame matching results may include the distances for all the frames from the seed sentinel frame signature.

A refined sentinel feature service 208 then generates a synthetic sentinel frame signature. The synthetic sentinel frame signature may be different from the seed sentinel frame signature. That is, the synthetic sentinel frame signature may include different feature values from the feature values of the seed sentinel frame signature. To generate the refined synthetic sentinel frame signature, refined sentinel feature service 208 may analyze the sentinel frame matching results and the seed sentinel frame signature to generate the synthetic sentinel frame signature. A method of generating the synthetic sentinel frame signature will be discussed in more detail below.

Once the synthetic sentinel features are generated, a refined sentinel matching service 210 may use the synthetic sentinel features to analyze a video program. This video program may be the same video program that was first analyzed to determine the synthetic sentinel frame signature or may be a different video program. For example, the synthetic sentinel frame signature may be used to determine sentinel frames in related videos, such as sporting events that may use the same sentinel frames to mark advertisements. Or, a second analysis of the video program is performed and then the sentinel frames from the second analysis are provided to video replacement system 104.

This process is similar to the process performed by feature match service 206, but refined sentinel match service 210 uses the synthetic sentinel frame signature instead of the seed sentinel frame signature. The output once again may include identifiers for the sentinel frames and can be used by video replacement system 104.

The synthetic sentinel frame signature may be a more accurate representation of the sentinel frames in the video program. Accordingly, the synthetic sentinel frame signature may yield more accurate results in selecting the sentinel frames for a video program.

Synthetic Sentinel Frame Signature Generation

FIGS. 3-5 will illustrate the synthetic sentinel frame signature generation process in more detail and show how the synthetic sentinel frame signature may yield more accurate results. FIG. 3 depicts an example of a distribution of frame signatures according to one embodiment. The signatures being shown are two-dimensional (2D) features that are illustrated by a "cross (+)" or "addition (+)" sign. Each symbol may represent a frame in the video program. Also, the different position of the symbols in the 2D space means that the corresponding frames have different signature values. Sentinel frame signatures are shown at 302-1 and non-sentinel frame signatures are shown at 302-2. The sentinel frame signatures and the non-sentinel frame signatures are the truth values. That is, the process should classify the frames of the video as only one of these values.

Figure 4A:
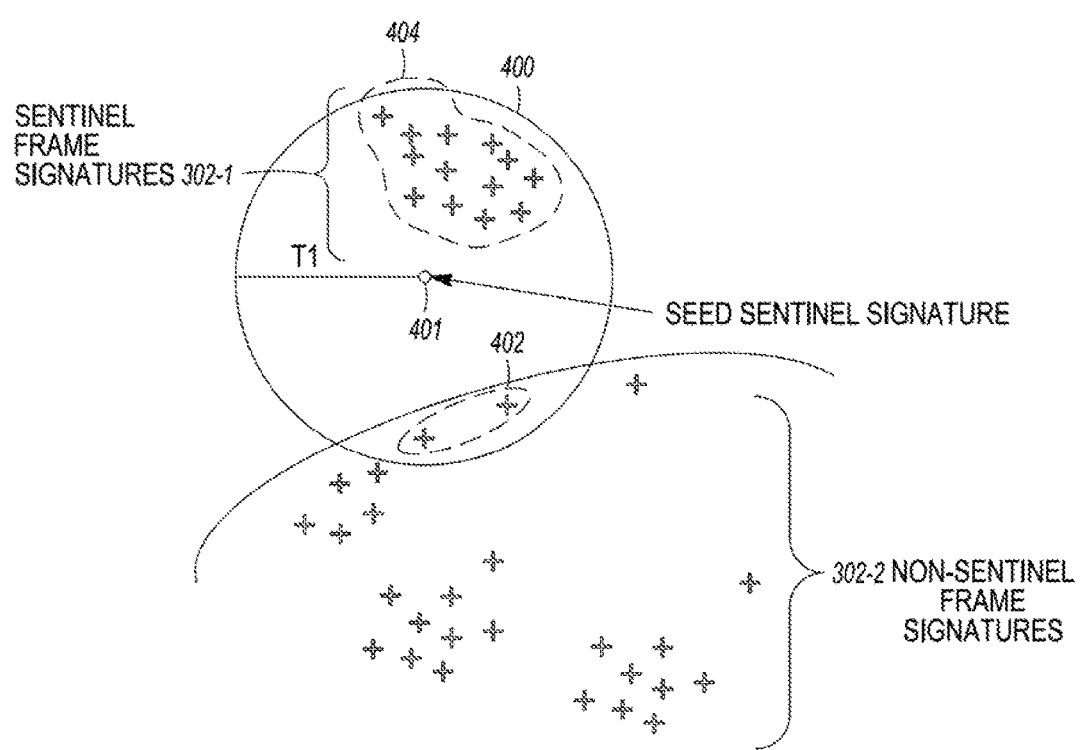
FIG. 4A shows an example of using a seed sentinel frame to classify sentinel frames according to one embodiment.

FIG. 4A shows an example of using a seed sentinel frame to classify sentinel frames according to one embodiment. FIG. 4A includes the same sentinel frame signatures and non-sentinel frame signatures as shown in FIG. 3. It should be noted that before the feature match service is performed, particular embodiments do not know which of these signatures are sentinel frame signatures and non-sentinel frame signatures. At 401, a seed sentinel frame signature is shown. The seed sentinel frame signature includes the seed sentinel features that are received for the seed sentinel frame. The seed sentinel frame signature is shown in a position in the 2D space based on the values of its features. That is, a different position in the X-Y space means the signatures have different values and frames with values outside of threshold T1 are classified as non-sentinel frames.

A threshold T1 may then be used to determine sentinel frame signatures. For example, a shape, such as a circle shown at 400, is generated using the threshold T1. The circle 400 is formed with the seed sentinel frame signature at the center with a radii T1. Any frame within this circle means its feature distance to the seed sentinel is less than threshold T1. In one embodiment, the circle represents the maximum allowable square error between the seed sentinel frame signature and the frame features of a detected sentinel frame within a two dimensional frame feature set. Within this circle, sentinel frame service 103 may determine that any frame signatures are sentinel frame signatures. Frames falling outside the circle are classified as non-sentinel frame signatures. In other words, frame signatures with values within a threshold T1 to the seed sentinel frame signature are classified as sentinel frames.

At 404, a cluster of sentinel frame signatures has been classified as sentinel frames correctly. However, at 402, the circle 400 has included some non-sentinel frame signatures as sentinel frames. This means that these non-sentinel frame signatures have values within threshold T1. Thus, using threshold T1 has produced some false positives with these non-sentinel frame signatures.

Figure 4B:
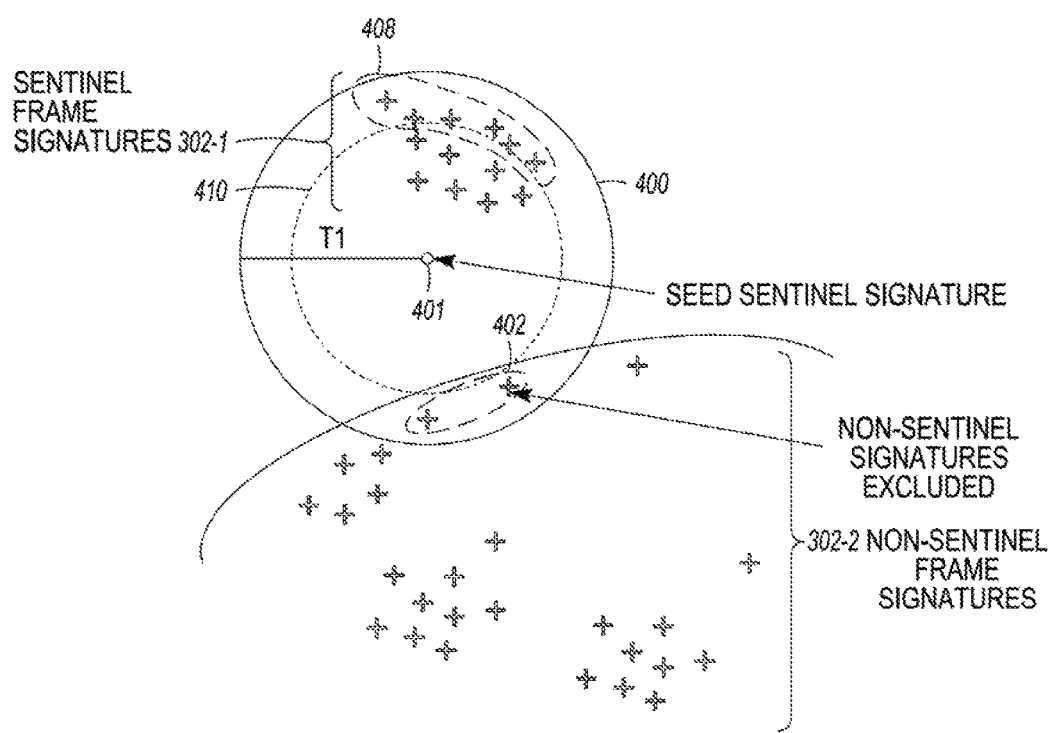
FIG. 4B shows an example of using a smaller threshold T2 according to one embodiment.

A smaller threshold T2 may be used to possibly exclude the non-sentinel frame signatures. FIG. 4B shows an example of using a smaller threshold T2 according to one embodiment. At 410, a smaller threshold is shown that forms a smaller circle than the circle 400. This excludes the non-sentinel frame signatures shown at 402. However, at 408, some sentinel frame signatures are also excluded due to the smaller threshold T2. This may be undesirable also as false negatives are now being experienced.

Figure 5A:
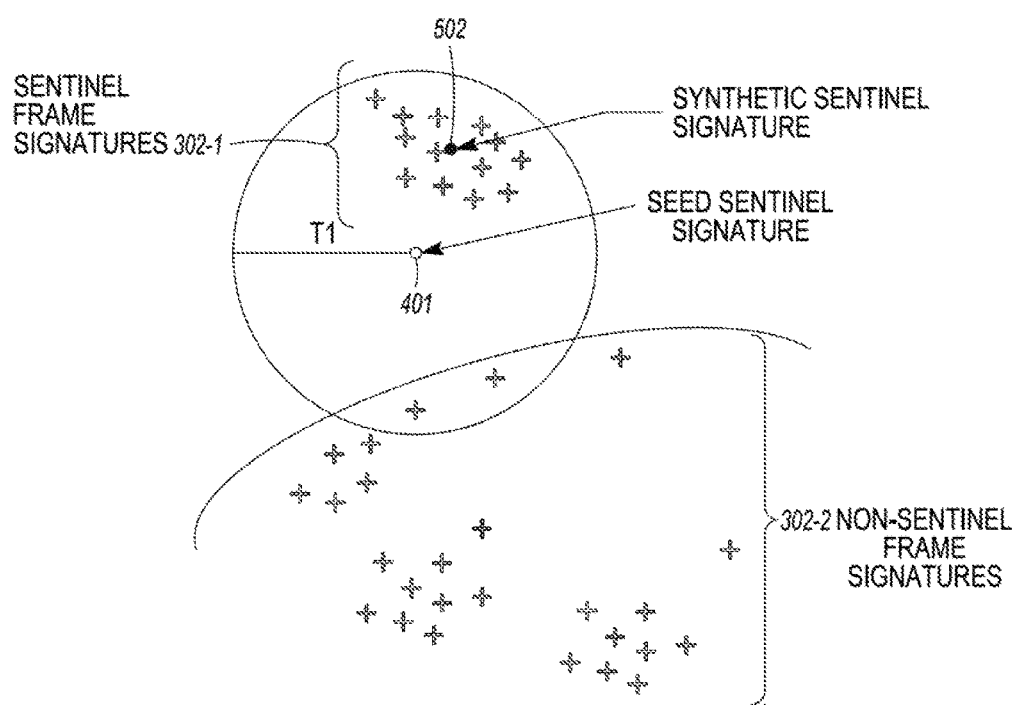
FIG. 5A shows the use of a synthetic sentinel frame signature according to one embodiment.

Particular embodiments may more accurately detect sentinel frames by using a synthetic sentinel frame signature. FIG. 5A shows the use of a synthetic sentinel frame signature according to one embodiment. Instead of using the seed sentinel frame signature, a synthetic sentinel frame signature shown at 502 may be used. In this case, the synthetic sentinel frame signature is more closely integrated with a cluster of the sentinel frame signatures. That is, the synthetic sentinel frame has a value closer to the values of other sentinel frame signatures. In one embodiment, a center of a cluster of sentinel frame signatures may be used to determine the position of the synthetic sentinel frame signature. This process of selecting the synthetic sentinel frame signature using the clusters of sentinel frame signatures will be described in more detail below.

Figure 5B:
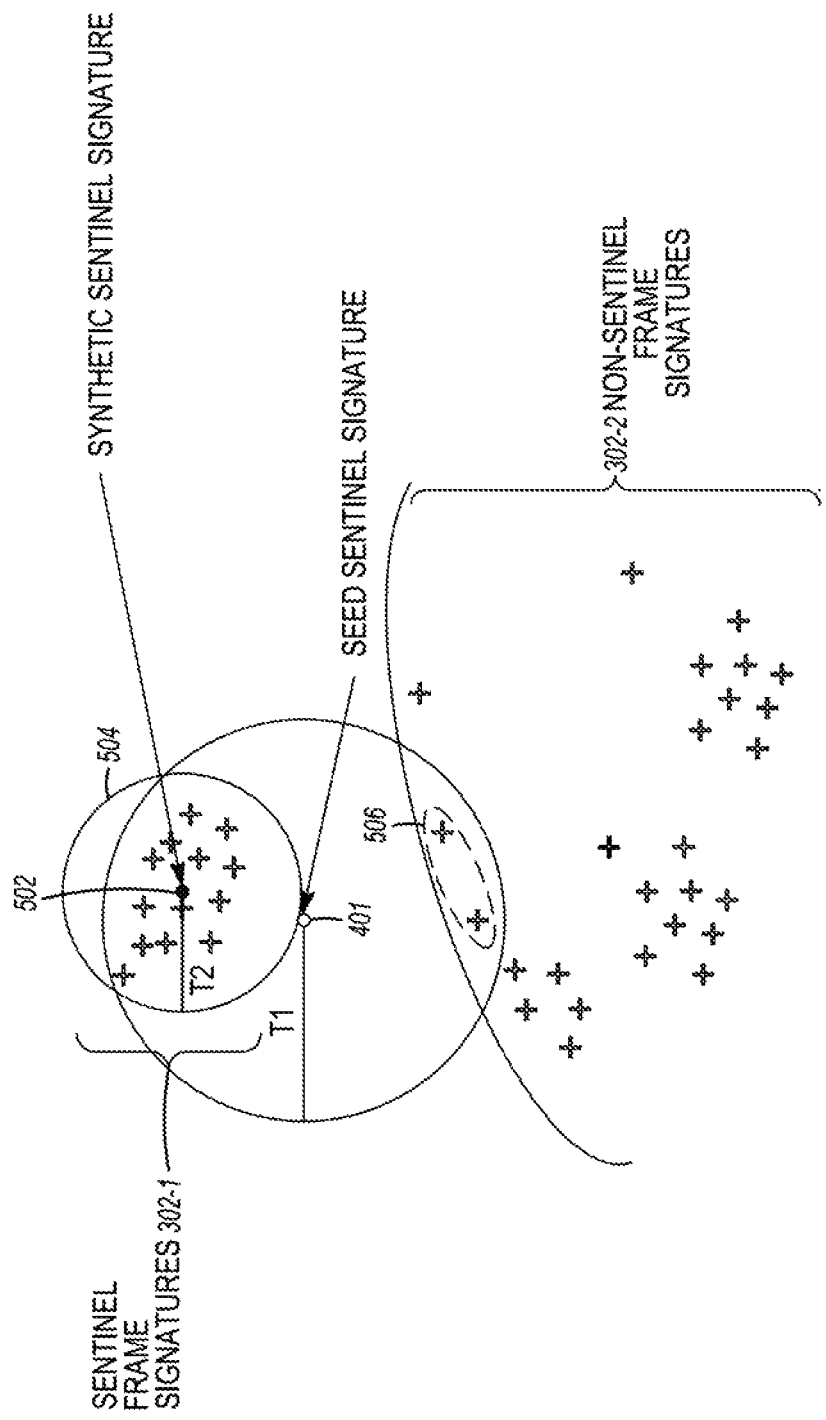
FIG. 5B shows an example of using the synthetic sentinel frame signature according to one embodiment.

Once generating the synthetic sentinel frame signature, it can be used to determine the sentinel frame signatures. FIG. 5B shows an example of using the synthetic sentinel frame signature according to one embodiment. A threshold T2 may be used to determine the sentinel frame signatures. The threshold T2 may be more strict than the threshold T1, such as threshold T2 is less than the threshold T1. This allows for a more accurate detection of sentinel frame signatures by lessening the chance that non-sentinel frame signatures are included, but since the synthetic sentinel frame signature is used, the chance that sentinel frame signatures are excluded using threshold T2 is also reduced. As is shown in circle 504, the sentinel frame signatures have been detected using the threshold T2. However, at 506, the non-sentinel frame signatures that were detected using threshold T1 are now not detected using the threshold T2 and the synthetic sentinel frame signature.

Method Flows

Figure 6:
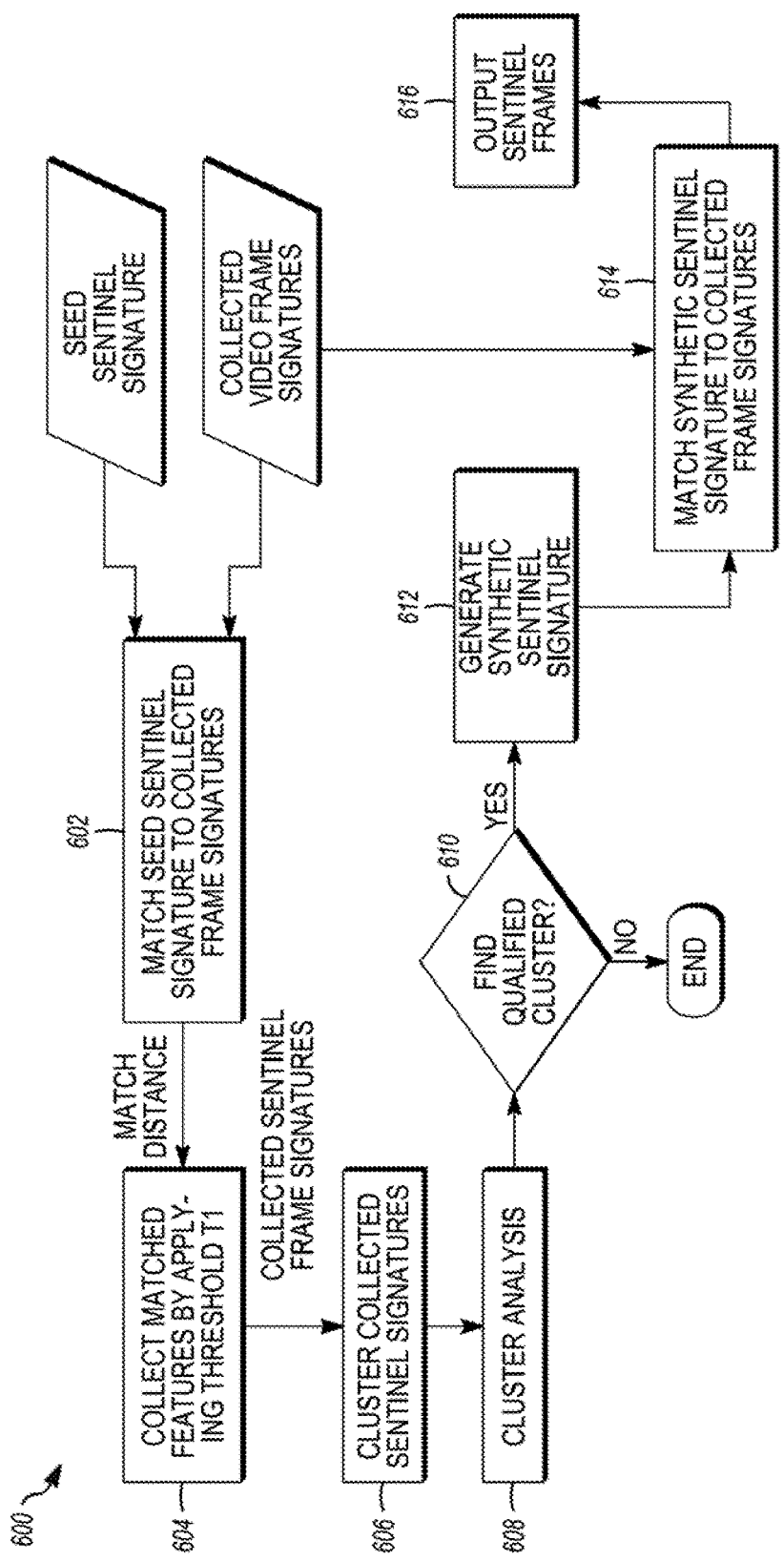
FIG. 6 depicts a simplified flowchart for generating the synthetic seed sentinel frame signature according to one embodiment.

The following will now describe the overall process in more detail. FIG. 6 depicts a simplified flowchart 600 for generating the synthetic seed sentinel frame signature according to one embodiment. At 602, sentinel frame service 103 matches the seed sentinel frame signature to the collected frame signatures for the frames of the video program. This may generate an initial matching distance curve between each frame and the seed sentinel frame. The matching distance curve is a measure or value that quantifies a difference between each frame and the seed sentinel frame. In one embodiment, the initial distance matching curve is the square error between the frame features of the synthetic seed sentinel and the collected frame signatures for the frames of the video program. The square error is proportional to the number of features in the frame features, and therefore the mean and standard deviation of the feature values should be normalized to ensure that each feature contributes equally to the initial distance matching curve. The square error of frames in the video containing a sentinel will be small, allowing a threshold to be used for detecting sentinel frames.

At 604, sentinel frame service 103 applies a first threshold T1 to the initial matching distance curve to collect all of the frame signatures that have a matching value that meets the first threshold (e.g., below the threshold, within the threshold, etc.) to create a first matching set of sentinel frame signatures. In other words, sentinel frame service 103 selects the sentinel frame signatures as was described in FIG. 5A using threshold T1. In one embodiment, enough sentinel frame signatures should be collected in order to proceed. That is, if only a small number of sentinel frame signatures is detected, the process of generating the synthetic sentinel frame signature may not be accurate.

At 606, sentinel frame service 103 applies a process to the collected sentinel frame signatures to generate the synthetic sentinel frame signature. In one embodiment, different clustering processes may be used, such as K-means or Gaussian mixture processes. A cluster may be a collection of sentinel frame signatures that may be considered a group, such as a cluster of signatures that are within a threshold. This may generate N clusters. Although clustering is described, other methods of determining the synthetic sentinel frame signature may be appreciated, such as via averaging.

At 608, sentinel frame service 103 analyzes the clusters of the first matching set of sentinel frame signatures to determine whether a qualified cluster can be used to generate the synthetic sentinel frame signature. In one embodiment, sentinel frame service 103 determines whether a meaningful match for a cluster has been determined. This may be determined based on the number of clusters and the number of sentinel frame signatures in each cluster. For example, if there are three clusters and one cluster has 50 candidate sentinel frame signatures and the other two clusters have 3 and 4 candidate sentinel frame signatures, respectively, then the first cluster may be selected because it has the most sentinel frame signatures in it. It is most likely that this cluster is the best representation of a synthetic sentinel frame signature. The other clusters may be frames that are false positives. However, if there are no clusters with sentinel frame signatures above a threshold, such as clusters only have one or two frames, then the generation of the synthetic sentinel frame signature may not be performed. In this case, there may not be sentinel frames in the video or the content provider may have changed the content of the sentinel frames. Also, sentinel frame service 103 may determine if a qualified cluster is determined by checking a distance between the sentinel seed signature and the synthetic sentinel frame signature to make sure there is not a significant deviation between them. For example, if there is a large distance between the two signatures, such as over a threshold or a standard deviation, then the synthetic sentinel frame signature may be too different and may not be accurate. For example, the video content provider may have changed the sentinel frame or the cluster may not be a sentinel frame.

At 610, sentinel frame service 103 determines if a qualified cluster was selected. If not, then the process ends. However, if a qualified cluster is determined, then at 612, sentinel frame service 103 generates the synthetic sentinel frame signature. For example, the center of the selected cluster may be used to generate the synthetic sentinel frame signature. The synthetic sentinel frame signature may be a collection of frame features based on the position in the center of the selected cluster. Other ways of generating the synthetic sentinel frame signature may also be used, such as averaging of all the values of the cluster.

After determining the synthetic sentinel frame signature, at 614, sentinel frame service 103 applies the synthetic sentinel frame signature to the frame signatures for all the frames of the video program to generate the sentinel frame set. First, sentinel frame service 103 may generate a refined matching curve that represents the distance between the frame signatures and the synthetic sentinel frame signature. In one embodiment, the refined matching curve is the sum of the squared distance between the synthetic sentinel frame signature and the signatures for all the frames of video. Then, sentinel frame service 103 applies a second threshold T2 to the matching curve to determine all the matching sentinel frames. At 616, sentinel frame service 103 may output the sentinel frames such as by outputting the frame identifiers or indices for the sentinel frames.

In another option, the synthetic sentinel frame signature may be used on other frame signatures from different video programs that may include similar sentinel frames. For example, content for a same broadcast channel in the past or future may be used or may be analyzed. This may include the same sporting events, same show, but different episodes, or other video programs.

Figure 7:
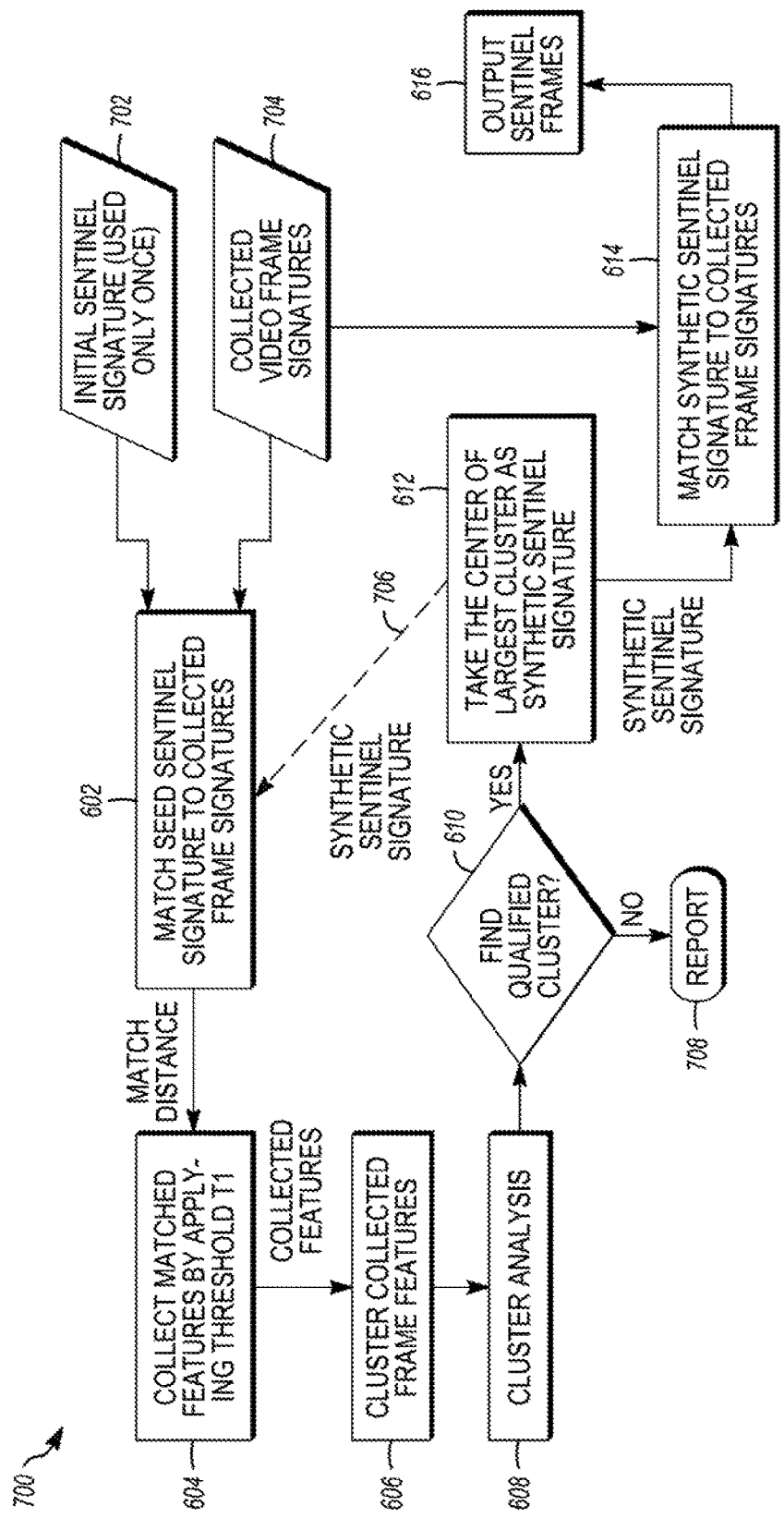
FIG. 7 shows a simplified flowchart that refines the synthetic sentinel frame signature according to one embodiment.

The synthetic sentinel frame signature may also be used as the seed sentinel in another analysis. Then, the process would refine the synthetic sentinel frame signature. FIG. 7 shows a simplified flowchart 700 that refines the synthetic sentinel frame signature according to one embodiment. At 702, an initial sentinel frame signature is used with the collected video frame features. The initial sentinel frame signature is only used once. The collected video frame signatures are also received at 704. Blocks 602, 604, 606, 608, 610, 612, 614, and 616 are the same as described in FIG. 6. However, at 706, the synthetic sentinel frame signature may be sent back to block 602 where the synthetic sentinel frame signature is used to match with collected frame signatures. The synthetic sentinel frame signature then becomes the seed sentinel frame signature and can then be further refined. The collected video frame signatures shown at 704 may be from the same video program or may be from a different video program, such as a next episode in a show or another sporting event from the same channel.

As this process is performed, there may be points where the qualified cluster is not found. At 708, this is reported. This is reported because there may be occurrences where the sentinel frame signature may be changed by the video program provider. In this case, the report may be used as an indication that the seed sentinel frame signature being used is most likely no longer useful or valid. Then, the video service provider can determine another seed sentinel that can restart the process. If the qualified clusters are not found, that means that the sentinel frame signature being used is not like any of the frames of the video.

Threshold Generation

The generation of the thresholds T1 and T2 may be determined differently. The threshold T1 is a loose threshold used to identify potential sentinel frame signatures with a given seed sentinel frame signature. The threshold T2 is generally a tighter threshold that is used to separate sentinel frame signatures from the rest of the frames in a video using the given synthetic sentinel frame signature. The values of T1 and T2 may depend on the features included in the signature and not on the content. For example, the features may include the color descriptor, which may use a first threshold, or an edge histogram, which would use another threshold. In one embodiment, the thresholds T1 and T2 are determined empirically, such as they are received at video processing system 102 based on observation of or selection by a user.

In another embodiment, the thresholds T1 and T2 may be determined automatically based on analyzing the statistics of features of the video. For example, the threshold T1 may be determined automatically based upon the number of features in a frame feature and the normalized range of the frame feature set. For example, if the feature set normalized range starts at 0 and ends at 1, then threshold T1 equals the maximum range of the feature set, which is 1, times the number of frame features, which is $F_n$, times alpha squared, where alpha may be a small positive number, such as in the range of 0.02 to 0.05. Restricting the size of alpha to a small positive number ensures that only small variations in the square distance are permitted when determining sentinel frame candidates.

The threshold T2 may be determined automatically by analyzing the distance distribution that is generated using the clusters of sentinel frames. In one embodiment, the threshold T2 is generated by looking at the feature distance distribution. During the cluster analysis, once the largest cluster has been identified, and its center calculated, the maximum distance, $D_{max}$, among all elements at this cluster to the center can be determined. In one embodiment, $T2=D_{max}+m$, where $m>0$ is a margin that can be empirically determined.

In another embodiment, the threshold T1 is determined after extracting threshold T2 from a cluster of candidate sentinel frames. For example, once threshold T2 is determined, this equation may be used to determine threshold T1 using threshold $T1=(1+delta)*threshold\ T2$, where $delta>0$ may be used (e.g., delta=0.5).

In another embodiment, the threshold T1 can be estimated from trustable data set. That is, sentinel frame signatures that have been verified from true sentinel frames, such as those identified via sentinel frame analysis. In one embodiment, the thresholds T1 and T2 may be determined with the following formulae:

Threshold T1=max(feature_dist(identified_sentinels, seed_sentinel)); and

Threshold T2=max(feature dist(cluster_sentinel, synthetic_sentinel))*alpha where alpha>0.

In the above, feature_dist is the feature distance. Identified_sentinels are the trusted sentinel frame signature. The seed_sentinel is the trusted seed sentinel frame signature. Threshold T1 is the largest feature distance guaranteed that all the sentinel frames will be identified using the seed sentinel. Once threshold T1 is determined, threshold T2 can be derived using the formula T1=(1+delta)*T2 where delta>0, or using the maximum in cluster distance (in this case, sentinel frame service 103 verifies that T2<=T1; and if not, adjusts alpha to make sure T2<=T1).

Accordingly, particular embodiments generate a synthetic sentinel frame signature that can select sentinel frames in a video program more accurately than using a seed sentinel frame. The synthetic sentinel frame signature may be used to compensate for differences in the sentinel frames that have been distorted by editing processing, compression processing, or other processing. Also, small changes in sentinel content can be detected and used to adjust the synthetic sentinel frame signature over time.

Example System

Figure 8:
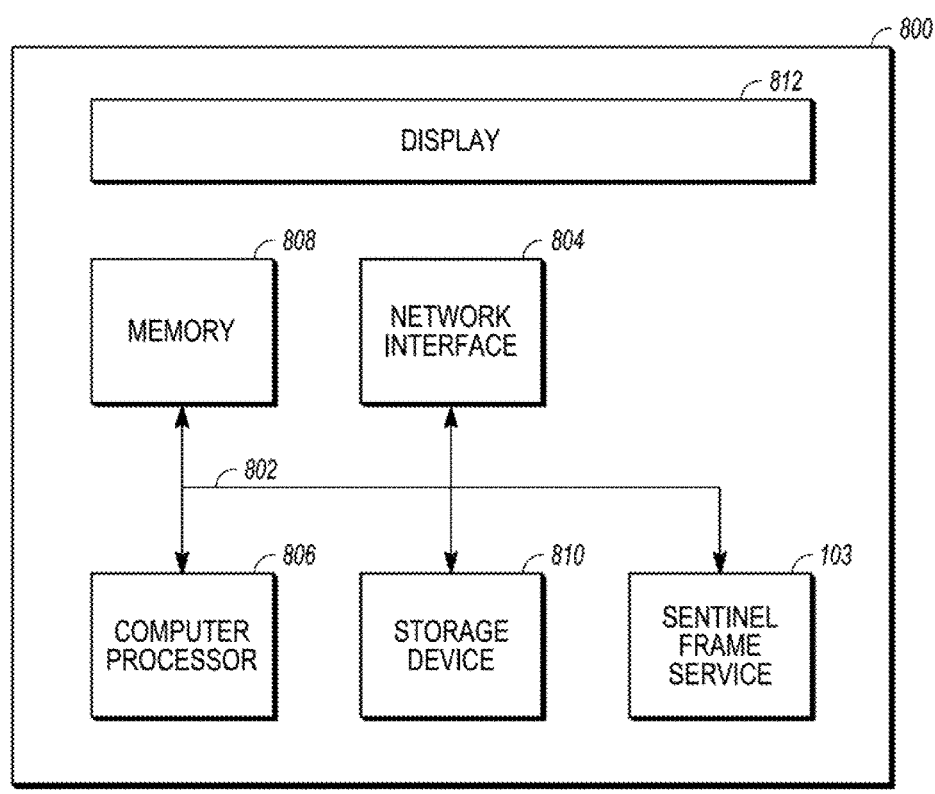
FIG. 8 illustrates an example of a special purpose computer system configured with a sentinel frame service according to one embodiment.

FIG. 8 illustrates an example of a special purpose computer system 800 configured with a sentinel frame service 103 according to one embodiment. In one embodiment, computer system 800 describes video processing system 102, but may also describe other entities described herein.

Computer system 800 includes a bus 802, network interface 804, a computer processor 806, a memory 808, a storage device 810, and a display 812.

Bus 802 may be a communication mechanism for communicating information. Computer processor 806 may execute computer programs stored in memory 808 or storage device 808. Any suitable programming language can be used to implement the routines of particular embodiments including C, C++, Java, assembly language, etc. Different programming techniques can be employed such as procedural or object oriented. The routines can execute on a single computer system 800 or multiple computer systems 800. Further, multiple computer processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The non-transitory computer-readable storage medium contains instructions for controlling a computer system 800 to be configured to perform functions described by particular embodiments. The instructions, when executed by one or more computer processors 806, may be configured to perform that which is described in particular embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through network 814. In some examples, client-server communications occur through network 814. Also, implementations of particular embodiments may be distributed across computer systems 800 through network 814.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
receiving, by a computing device, a first signature for a video that includes a plurality of frames, wherein the first signature is based on a first set of features;
analyzing, by the computing device, the plurality of frames of the video using the first signature to identify a first set of frames from the plurality of frames that are defined as sentinel frames of the video, wherein the sentinel frames identify a transition from a first type of video content to a second type of video content, wherein the analyzing the plurality of frames comprises:
generating a plurality of matching measures between the first signature and the plurality of frames, and applying a first threshold to the plurality of matching measures to select the first set of frames; and analyzing, by the computing device, the first set of frames to generate a second signature, the second signature including a second set of features that is different from the first set of features;
wherein the first set of frames has a first matching measure in the plurality of matching measures that meets the first threshold, and
wherein a second set of frames has a second matching measure in the plurality of matching measures that does not meet the first threshold, wherein the second set of frames are not used to generate the second signature.

2. A method comprising:
receiving, by a computing device, a first signature for a video that includes a plurality of frames, wherein the first signature is based on a first set of features;
analyzing, by the computing device, the plurality of frames of the video using the first signature to identify a first set of frames from the plurality of frames that are defined as sentinel frames of the video, wherein the sentinel frames identify a transition from a first type of video content to a second type of video content;
analyzing, by the computing device, the first set of frames to generate a second signature, the second signature including a second set of features that is different from the first set of features, wherein the analyzing the first set of frames to generate the second signature comprises:
comparing a distance between the first signature and the second signature to a deviation threshold, and
when the distance is within the deviation threshold, generating the second signature; and
outputting, by the computing device, the second signature as a replacement for the first signature.

3. The method of claim 2, further comprising:
applying, by the computing device, the second signature to the plurality of frames to generate a second set of frames that are defined as the sentinel frames of the video.

4. The method of claim 3, wherein the second set of frames include different frames from the first set of frames.

5. The method of claim 3, further comprising:
performing a service on the second set of frames, wherein the second set of frames are of the second type of video content.

6. The method of claim 5, wherein the service is not performed on frames in the plurality of frame that are not the second set of frames, wherein the first set of frames are of the first type of video content.

7. The method of claim 2, wherein analyzing the first set of frames comprises:
applying a process to generate a set of clusters from frames in the first set of frames, wherein a cluster includes one or more of the first set of frames; and
generating the second signature based on one of the set of clusters.

8. The method of claim 7, wherein the second signature is based on a position within the one of the set of clusters.

9. The method of claim 8, wherein the position is a center of the one of the set of clusters.

10. The method of claim 7, wherein the second signature is defined based on features from the one of the set of clusters.

11. The method of claim 2, wherein:
the first set of frames is selected based on applying a first threshold to the first signature, and
a second set of frames is selected based on applying a second threshold to the second signature, wherein the second threshold is different from the first threshold.

12. The method of claim 11, wherein the second threshold is less than the first threshold.

13. The method of claim 2, wherein the video comprises a first video, the method further comprising:
applying the second signature to a second plurality of frames of a second video to generate a second set of frames that are considered the sentinel frames of the second video.

14. The method of claim 13, further comprising:
performing a service on the second set of frames, the second set of frames being the second type of video content.

15. A non-transitory computer-readable storage medium containing instructions that, when executed, control a computer system to be configured for:
receiving a first signature for a video that includes a plurality of frames, wherein the first signature is based on a first set of features;
analyzing the plurality of frames of the video using the first signature to identify a first set of frames from the plurality of frames that are defined as sentinel frames of the video, wherein the sentinel frames identify a transition from a first type of video content to a second type of video content;
analyzing the first set of frames to generate a second signature, the second signature including a second set of features that is different from the first set of features, wherein the analyzing the first set of frames to generate the second signature comprises:
comparing a distance between the first signature and the second signature to a deviation threshold, and
when the distance is within the deviation threshold, generating the second signature; and
outputting the second signature as a replacement for the first signature.

16. The non-transitory computer-readable storage medium of claim 15, wherein the instructions, when executed, further control the computer system to be configured for:
applying, by the computer system, the second signature to the plurality of frames to generate a second set of frames that are defined as the sentinel frames of the video.

17. A method comprising:
receiving, by a computing device, a first signature for a video that includes a plurality of frames, wherein the first signature is based on a first set of features;
analyzing, by the computing device, the plurality of frames of the video using the first signature to identify a first set of frames from the plurality of frames that are defined as sentinel frames of the video, wherein the sentinel frames identify a transition from a first type of video content to a second type of video content;
analyzing, by the computing device, the first set of frames to generate a second signature, the second signature including a second set of features that is different from the first set of features, wherein the analyzing the first set of frames to generate the second signature comprises:
comparing a distance between the first signature and the second signature to a deviation threshold, and
when the distance is within the deviation threshold, generating the second signature;

outputting, by the computing device, the second signature as a replacement for the first signature; and when the second signature should be applied to the video, applying, by the computing device, the second signature to the plurality of frames to generate a second set of frames that replace the first set of frames as the sentinel frames of the video.

18. The method of claim 17, wherein the video comprises a first video, the method further comprising:

when the second signature should be applied to a second video, applying the second signature to a second plurality of frames of the second video to generate a third set of frames that are considered the sentinel frames of the second video.

* * * * *